(12) United States Patent
He

(10) Patent No.: US 8,179,568 B2
(45) Date of Patent: May 15, 2012

(54) MINIMIZING DOT GRAININESS IN DOT-ON-DOT PRINTING DEVICES

(75) Inventor: Zhen He, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 877 days.

(21) Appl. No.: 12/178,960

(22) Filed: Jul. 24, 2008

(65) Prior Publication Data

US 2010/0020339 A1 Jan. 28, 2010

(51) Int. Cl.
*G06F 15/00* (2006.01)
*G06K 9/00* (2006.01)

(52) U.S. Cl. .......... 358/1.9; 358/1.2; 358/1.7; 358/1.13; 358/1.15; 358/2.1; 358/3.01; 358/3.02; 358/3.03; 358/3.06; 358/3.1; 358/3.13; 358/3.19; 358/3.22; 358/3.3; 358/515; 358/529; 358/534; 382/162; 382/163; 382/166; 382/167; 382/172; 382/178; 382/183; 382/205; 382/224; 382/254; 382/261; 382/277; 382/280; 382/293; 382/299; 382/307; 382/322; 347/15; 347/131; 347/230; 347/254; 399/147; 399/138; 399/178; 399/181; 399/184; 399/223; 399/321

(58) Field of Classification Search ................. None
See application file for complete search history.

(56) References Cited

U.S. PATENT DOCUMENTS

| | | | |
|---|---|---|---|
| 5,621,546 A * | 4/1997 | Klassen et al. ............. | 358/536 |
| 5,748,785 A | 5/1998 | Mantell et al. | |
| 5,784,496 A | 7/1998 | Mantell | |
| 5,963,715 A * | 10/1999 | Shu et al. ............. | 358/1.9 |
| 6,014,233 A | 1/2000 | Fan et al. | |
| 6,039,434 A * | 3/2000 | Moroney ............. | 347/43 |
| 6,157,469 A | 12/2000 | Mestha | |
| 6,250,733 B1 | 6/2001 | Yao et al. | |
| 6,501,564 B1 | 12/2002 | Schramm et al. | |
| 6,705,703 B2 * | 3/2004 | Zeng et al. ............. | 347/43 |
| 6,721,440 B2 * | 4/2004 | Reed et al. ............. | 382/100 |
| 6,870,644 B2 | 3/2005 | Schramm et al. | |
| 7,499,203 B2 | 3/2009 | Yao | |
| 2006/0132825 A1 | 6/2006 | Czudak et al. | |
| 2006/0215189 A1 | 9/2006 | Yao | |
| 2006/0227394 A1 | 10/2006 | He | |
| 2006/0238800 A1 | 10/2006 | Czudak et al. | |
| 2009/0195836 A1 | 8/2009 | He | |
| 2010/0020339 A1 | 1/2010 | He | |

OTHER PUBLICATIONS

U.S. Appl. No. 12/258,494, filed Oct. 27, 2008, He et al.
U.S. Appl. No. 12/420,490, filed Apr. 8, 2009, He.
U.S. Appl. No. 12/025,838, filed Feb. 5, 2008, He.
Shaked, et al., "Ink Relocation for Color Halftones," © Hewlett-Packard Company, 1999, pp. 1-11.

* cited by examiner

*Primary Examiner* — Steven Kau
(74) *Attorney, Agent, or Firm* — Philip E. Blair; Fleit Gibbons Gutman Bongini & Bianco P.L.

(57) ABSTRACT

What is disclosed is a novel system and method for minimizing dot visibility in color marking devices capable of dot-on-dot printing. The present method achieves minimum dot visibility for a given dispersed-dot screen by performing a CMYK to CMYKRGB conversion which uses less visible dots as much as possible before more visible dots are introduced. The output color dot coverages are calculated sequentially to minimize the coverage of more visible dots in a decreasing order of brightness. Resulting images have noticeably reduced halftone graininess, particularly in the mid to darker tone areas. The present method is also computationally efficient.

15 Claims, 6 Drawing Sheets

MINIMIZING DOT GRAININESS IN DOT-ON-DOT PRINTING DEVICES

TECHNICAL FIELD

The present invention is directed to systems and methods for vector halftoning using less visible dots to reduce graininess in color images printed by inkjet devices capable of dot-on-dot printing.

BACKGROUND

Raster type printers, which have been implemented with various print engines commonly found in the arts, such as electro-photographic print engines and ink jet print engines, employ half-toning to transform continuous tone image data to print data that can be printed as an array of dots that can be of substantially similar size. For example, 24 bit/pixel continuous tone image data can be half-toned to a plurality of single color one-bit per pixel bitmaps.

Half-toning may employ a screen having a matrix of different threshold values. A screen can be a data set with different print density values equally represented (or with a controlled unequal distribution for gamma-compensated screens). For monochrome printing, the image data is then compared with the screen thresholds at each position. If the image data exceeds the threshold, a dot is printed. Otherwise, that particular location remains unprinted.

Improved appearance can be provided using, for example, a pseudo-random stochastic screen having a "blue noise" characteristic. Such screens tend to have threshold values which are distributed so that adjacent values tend to be very different. Thus, any value or limited range of values will tend to be located at positions that are nicely spaced apart on the matrix. In this example, apparently even but random spacing can be emphasized at very low and high density values in a blue noise screen.

For printing with multiple colors, half-toning presents a particular challenge. For dot-on-dot printing, in which printed locations are printed with one or more dots, a single half-toning screen can be used. For instance, a field of 10% blue would have 10% of locations printed with cyan and magenta ink, while 90% of locations remain unprinted. This has the disadvantage of reduced spatial frequency with respect to methods that distribute dots to different locations. This also tends to give the appearance of darker dots more widely spaced apart, producing a grainy image. The same can be said for clustered dot printing techniques in which different color dots may be printed adjacent to each other or otherwise clustered to create a multi-dot cluster that reads as an intermediate color. Accordingly, it is desirable to print the individual dots at closely spaced separate (non-overlapping) locations, relying on the viewer's eye to integrate the different color dots into the intended color.

By using different screens having the threshold values arranged differently, the dots will tend not to align with each other. However, with uncorrelated screens, the printed patterns of different colors will tend to be randomly located with respect to each other. This can generate some graininess of an image as some dots happen to clump near others or overlap. To reduce this with two colors, an inverted screen can be used for one of the colors. An inverted screen often has values equal to the maximum screen value (less the screen value at the corresponding location on the other screen). Thus, 10% blue is printed by printing cyan dots at all locations where the threshold values of the original screen are 25 or less. Magenta dots are printed at locations of values of 230 and above on the original screen (25 or less on an inverted screen). Inverted screens can be limited in usefulness for several reasons.

First, inverted screens may only be used for two colors. This can be inadequate for most multiple color printing systems. Where image quality is not critical in tri-color Cyan, Magenta, Yellow (CMY) systems, the darker C and M dots may be printed in this way while the less visible yellow dots may be distributed otherwise. For four-color systems employing black ink and for multi-level grayscale printing, the inverted screen may not provide desired image quality.

Second, for two color systems where one color is printed at the lowest value range positions, and another is printed at the highest value range positions, those positions are not relatively well dispersed with respect to each other in a blue noise screen. Although it will not generate overlapping droplets at less than full coverage printing, a high frequency blue noise screen may lead to clumps of adjacent dots. Beyond the random effects leading to such clumping, widely different values are more likely to be adjacent to each other.

For three and four color systems, a shifted screen approach has been employed to avoid pure dot-on-dot printing for some colors. This can lead to increased graininess of the image but often generates unwanted low frequency artifacts that are visible in the printed image. Moiré patterns may also be generated. It can be difficult to achieve substantial uniformity or even distribution of the half-toned dots in dot-on-dot printing devices.

Accordingly, what is needed in this art are increasingly sophisticated systems and methods for minimizing dot visibility by reducing halftone dot graininess in output color images printed by ink jet products capable of dot-on-dot printing.

BRIEF SUMMARY

What is provided are a novel system, method, and computer program product for minimizing dot visibility in color marking devices capable of dot-on-dot printing. The present method achieves minimum dot visibility for a given dispersed-dot screen by performing a CMYK to CMYKRGB conversion which uses less visible dots as much as possible before more visible dots are introduced. The output color dot coverages are calculated sequentially to minimize the coverage of more visible dots in a decreasing order of brightness. Resulting images have noticeably reduced halftone graininess, particularly in the mid to darker tone areas. The present method is also computationally efficient.

As will be explained herein in greater detail, an input $C_{in}/M_{in}/Y_{in}$ channels and a colorant Kin are received. Optionally, if any of the primary $C_{in}/M_{in}/Y_{in}$ inputs are greater than a predetermined threshold, each can be clipped such that no primary colorant overlaps with colorant $K_{in}$. The received CMY inputs are summed to obtain a total CMY ink coverage. An amount of overlapping CMY (composite K') is determined. The amount composite K' is subtracted from each $C_{in}/M_{in}/Y_{in}$ input to obtain individual remaining CMY ink coverages. A total remaining CMY ink coverage is determined by summing the individual remaining CMY ink coverages. The input $K_{in}$ is added to the amount of CMY overlap to obtain an output $K_{out}$. A minimum total secondary RGB coverage area is determined which is required to achieve the total remaining CMY ink coverage. An output minimum secondary RGB color coverage, $B_{out}$, $R_{out}$, $G_{out}$, is determined which is required to overlap its corresponding primary color. An output minimum primary CMY color coverage, $C_{out}$, $M_{out}$, $Y_{out}$, necessary to maintain input densities is determined. The color marking device can thereafter be halftoned using the determined minimum color output coverages. By using as many less visible dots as possible, each of the input $C_{in}/M_{in}/Y_{in}$ (and $K_{in}$) have been converted to an output coverage amount necessary to achieve the smoothest halftone.

The foregoing and other features and advantages will be apparent from the following more particular description of the various embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
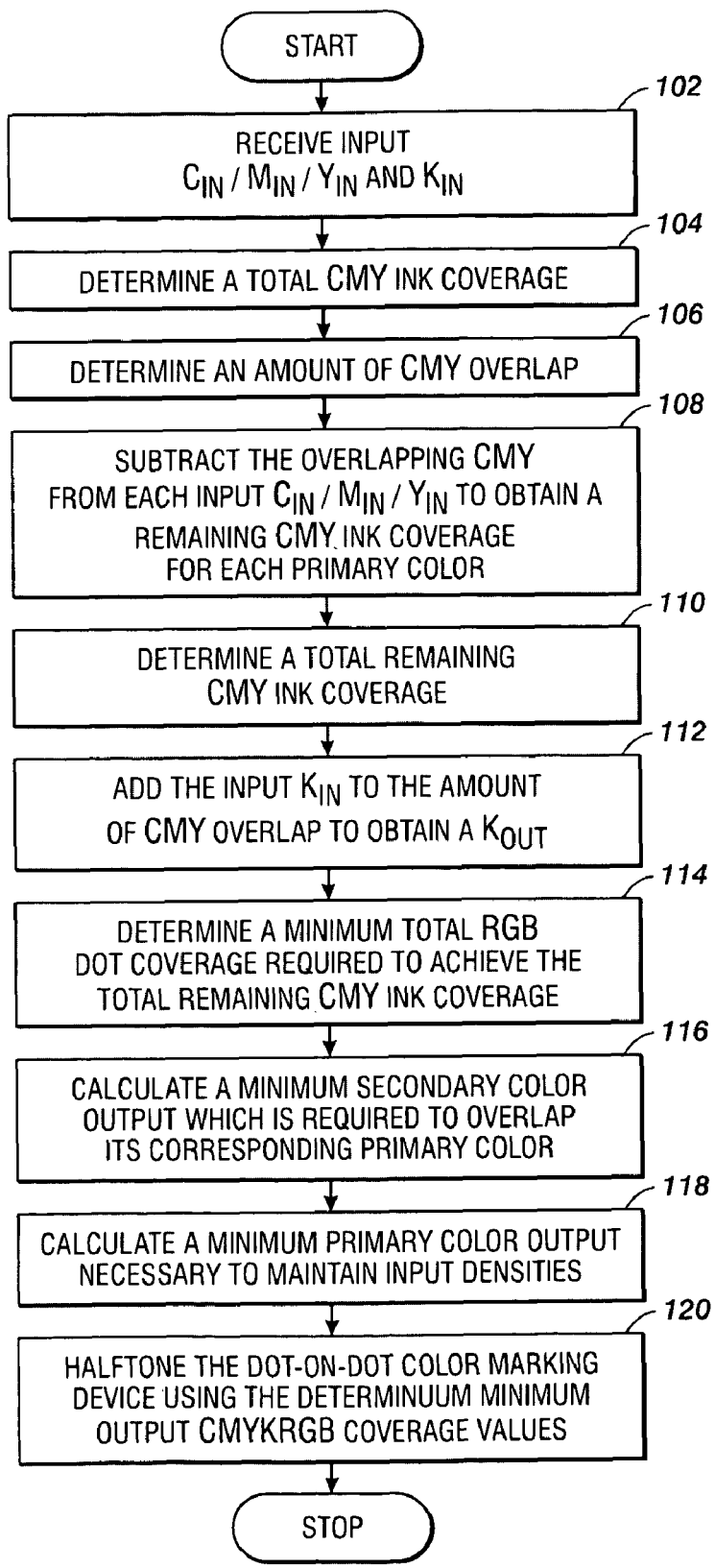
FIG. 1 illustrates one embodiment of the present method for vector halftoning to minimize dot visibility in color marking devices capable of dot-on-dot printing.

What is provided are a system and method for minimizing dot visibility in color marking devices capable of dot-on-dot printing. The present method achieves minimum dot visibility for a given dispersed-dot screen by performing a CMYK to CMYKRGB conversion which uses less visible dots as much as possible before more visible dots are introduced. As will be described herein in more detail, the output color dot coverages are calculated sequentially to minimize the coverage of more visible dots in a decreasing order of brightness.

It should be understood that one of ordinary skill in this art would be readily familiar with many facets of color science such as, but not limited to, halftoning processes, halftone screens, dot-on-dot printing systems, color space, color gamuts, and other related techniques commonly found in this art. Additionally, one of ordinary skill in this art would also be familiar with advanced mathematical techniques use in various color manipulation and color transformation algorithms. One of ordinary skill would be knowledgeable about computer science and software and programming systems and methods sufficient to implement the functionality and capabilities described in detail herein in their own color management systems and environments without undue experimentation.

A pixel, as used herein, refers to the smallest segment into which a printed image is divided and may also refers to a signal associated with a particular position in an image. Each pixel can be a bit in binary form, a gray scale value, or a set of coordinates in the color space of the image. Pixel values can be converted into CIELAB color space by a RBG to Lab converter to obtain luminance (L) and chrominance (a,b) values. Chrominance (a) is the chrominance of a first channel. Chrominance (b) is the chrominance of a second channel. Luminance (L) is the luminous intensity per unit area and can also represent a general tone measurement such as optical density, color difference, brightness/lightness, reflectance, or other measurements.

CIELAB is a color space specified by the Commission Internationale d'Eclairage (CIE) which describes all the colors visible to the human eye. It was created to serve as a device independent model to be used as a reference. The three coordinates of CIELAB represent the lightness of the color (L*, L*=0 yields black and L*=100 indicates diffuse white; specular white may be higher), its position between Red/Magenta and Green (a*, negative values indicate Green while positive values indicate Magenta) and its position between Yellow and Blue (b*, negative values indicate Blue and positive values indicate Yellow). The asterisk (*) after L, a and b are part of the full name, since they represent L*, a*, b*, to distinguish them from L, a, b. The L*a*b* model is a three-dimensional color model. It should be understood that a Lab color space is a color-opponent space with dimension L* for luminance and a and b for the color-opponent dimensions, based on non-linearly compressed CIEXYZ color space coordinates. Lab is now often used as an informal abbreviation for CIELAB.

A process color refers to all colors that are a combination of primary colors and includes secondary colors (with 2 primary colors involved) and a process black (with the same amount of 3 primary colors involved). Primary colors are understood to be: Cyan (C), Magenta (M), Yellow (Y), and Black (K). Secondary colors are understood to be: Red=(M+Y), Blue=(C+M), and Green=(C+Y). For CMYK printing, dot visibility decreases in the order of brightness as given by: Black, Blue, Red, Green, Magenta, Cyan, and Yellow. The order of brightness may vary depending on the precise color composition of the inks.

Inkjet products operate by propelling variably-sized droplets of liquid or molten material (inks, pigments, etc.) mixed with a colorant onto a media substrate, such as paper. The output image is formed from the visual integration of the colored dots. Appropriate sizing operations have to be performed for images where the input resolution in terms of scanned pixels is different from the output resolution in terms of printed pixels.

Reference is now being made to FIG. 1 which illustrates one embodiment of the present method for vector halftoning to minimize dot visibility in color marking devices capable of dot-on-dot printing.

In one embodiment shown, at 102, input $C_{in}/M_{in}/Y_{in}$ channels and a colorant $K_{in}$ are received. If any of the primary $C_{in}/M_{in}/Y_{in}$ inputs are greater than a predetermined threshold, each can be clipped such that no primary input colorant overlaps with colorant $K_{in}$. At 104, the received $C_{in}/M_{in}/Y_{in}$ inputs are summed to obtain a total CMY ink coverage. At 106, an amount of overlapping CMY (composite K') is determined. At 108, the amount composite K' is subtracted from each $C_{in}/M_{in}/Y_{in}$ to obtain a remaining CMY ink coverage for each primary color. At 110, a total remaining CMY ink coverage is determined. At 112, the input $K_{in}$ is added to the amount of overlapping CMY to obtain an output black $K_{out}$. At 114, a minimum total secondary RGB coverage is determined which is required to achieve the total remaining CMY ink coverage. At 116, a minimum secondary color output, $B_{out}, R_{out}, G_{out}$, coverage is determined which is required to overlap its corresponding primary color. At 118, a minimum primary color output, $C_{out}, M_{out}, Y_{out}$, coverage necessary to maintain input densities is determined. At 120, the color marking device is halftoned using the determined minimum color output coverages. In such a manner, each of the input $C_{in}/M_{in}/Y_{in}$ (and $K_{in}$) have been converted to an output coverage amount necessary to achieve the smoothest halftone.

In order to simplify the discussion hereof, several assumptions are made. First, it is assumed that any C, M and Y overlapping is replaced by a dot of k colorant. Second, no other colorant is allowed to overlap with a dot of colorant k. One skilled in this art would understand that these two assumptions are typical of solid ink printers. These assumptions should not be viewed as limiting. If necessary, these two constraints can be removed. It is also assumed that the ink coverage range of each colorant is scaled from 0 to 100.

Figure 2:
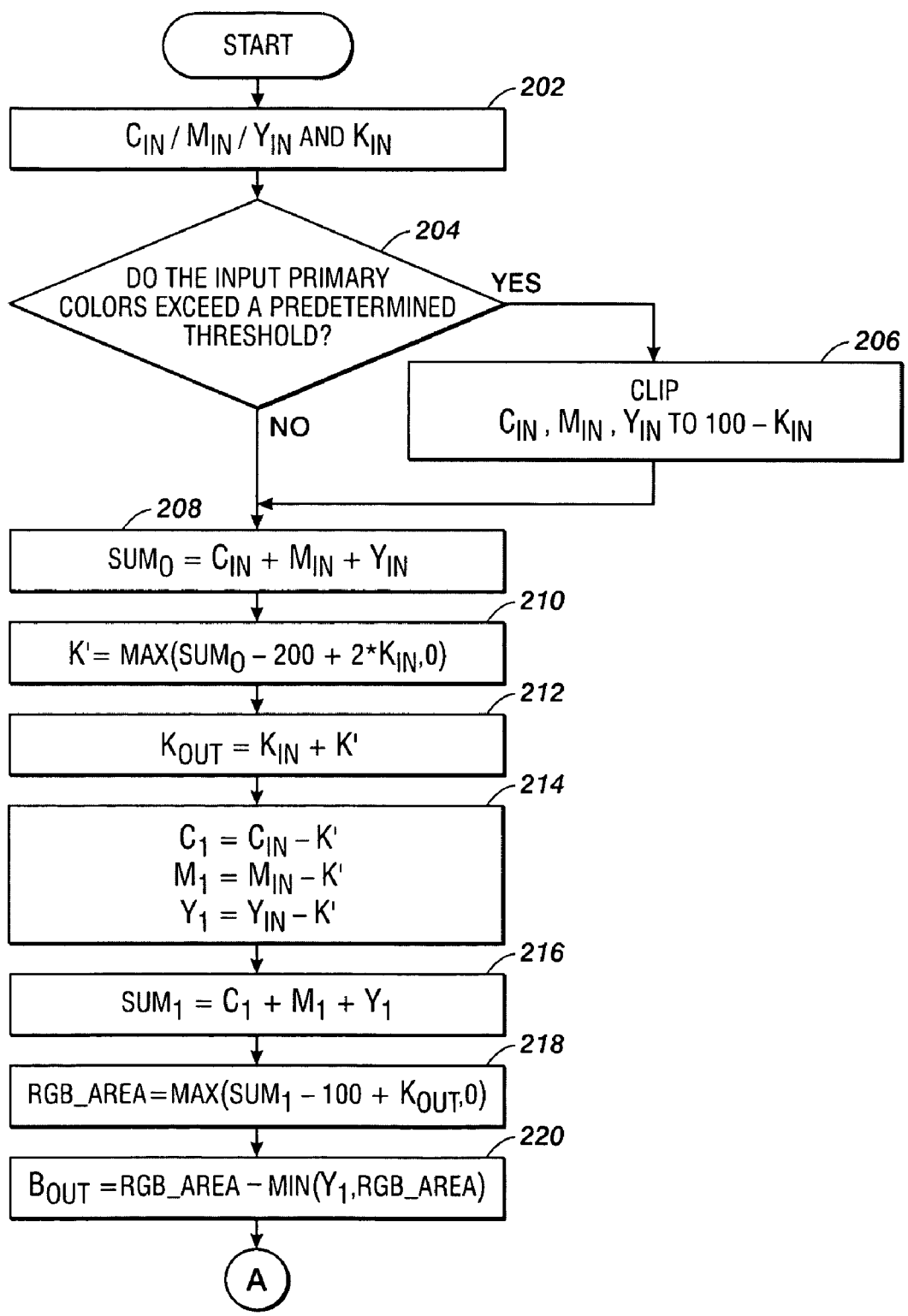
FIG. 2 illustrates one embodiment of the input CMYK to output CMYKRGB conversion in accordance with the present method.

Reference is now being made to FIG. 2 illustrating one embodiment of the input CMYK to output CMYKRGB conversion.

At 202, the present method first receives $C_{in}/M_{in}/Y_{in}$ and $K_{in}$ channel inputs. These inputs comprise the CMY primaries and a black colorant. Such inputs are received, in one example, through a scanning process known in the arts or alternatively received through a process of direct measurement by measurement devices known in the arts. Such inputs may additionally be retrieved from a storage device or received as signals over a network. One skilled in this art would appreciated the exact nature of the received channel inputs will depend on the system environment wherein the present invention will finds its intended uses.

At 204, a determination is made whether any of the primary $C_{in}/M_{in}/Y_{in}$ inputs is greater than a predetermined threshold value. If any $C_{in}/M_{in}/Y_{in}$ input is greater than the predetermined threshold value then the $C_{in}/M_{in}/Y_{in}$ values can be clipped, at 206, to a level of 100-$K_i$. This is performed in order to meet the previous assumption that no other colorant K be allowed to overlap with a dot of k colorant. Such a threshold determination is optional and may not be required in systems wherein a predetermined threshold level will never be exceeded.

At 208, the total CMY ink coverage (sum$_0$) for the $C_{in}/M_{in}/Y_{in}$ inputs is determined. The total CMY toner coverage is determined by summing the received $C_{in}/M_{in}/Y_{in}$ channels (after any clipping), and is given by:

$$sum_0 = C_i + M_i + Y_i.$$

At 210, total amount of overlapping CMY, i.e., the minimum extra black coverage K' (referred to herein as composite K') is determined from the total CMY ink coverage (sum$_0$) minus an adjusted amount of $K_{in}$. Composite K' is the amount of the colorant K to be replaced by k colorant required to achieve a desired input CMY coverage Composite K' is determined by:

$$K' = \max(sum_0 - 200 + 2*K_{in}, 0).$$

At 212, the amount of output black coverage ($K_{out}$) is determined by:

$$K_{out} = K_{in} + K'.$$

Note that the equation for the determination of the output black coverage, $K_{out}$, can be consolidated into the equation for the minimum total secondary RGB dot coverage area (rgb_area) defined herein further.

At 214, for each of the CMY colors, a density is determined by subtracting the amount of overlapping CMY from each $C_{in}/M_{in}/Y_{in}$ input to obtain a remaining CMY ink coverage, $C_1, M_1, Y_1$, for each color. The individual amounts of remaining CMY ink coverage is also referred to herein as the density. Each of the remaining CMY ink coverages, $C_1/M_1/Y_1$, is determined as the $C_{in}/M_{in}/Y_{in}$ input less the amount of extra black coverage (composite K') required, as given by:

$$C_1 = C_{in} - K',$$

$$M_1 = M_{in} - K',$$

$$Y_1 = Y_{in} - K'.$$

At 216, the remaining CMY ink coverages for each of the primary CMY colors are added to obtain a total remaining CMY toner coverage. The total remaining CMY toner coverage (total CMY input density) is given by:

$$sum_1 = C_1 + M_1 + Y_1.$$

At 218, the minimum total secondary RGB coverage area (rgb_area) required to achieve the total CMY density is given by:

$$rgb\_area = \max(sum_1 - 100 + K_{out}, 0).$$

A further determination can be made to determine whether the minimum total secondary RGB coverage area are equals zero and the process aborted accordingly.

The remaining issue now is how to fill the space defined by the above-determined minimum total secondary RGB coverage area. The present method provides a minimum brightness variation criterion.

First, the amount of blue dot coverage is minimized under the above-constraints of the minimum total secondary RGB coverage (rgb_area) and the total remaining CMY ink coverage (sum$_1$). Depending on the amount of total remaining CMY ink coverage, blue dots may be inevitable in some cases. However, as much red/green coverage needs to be created to fill the space defined by the minimum total secondary RGB coverage to minimize the amount of output blue.

At 220, the minimum amount of output blue coverage ($B_{out}$) required to overlap its corresponding primary color is given by:

$$B_{out} = rgb\_area - \min(Y_1, rgb\_area).$$

Figure 3:
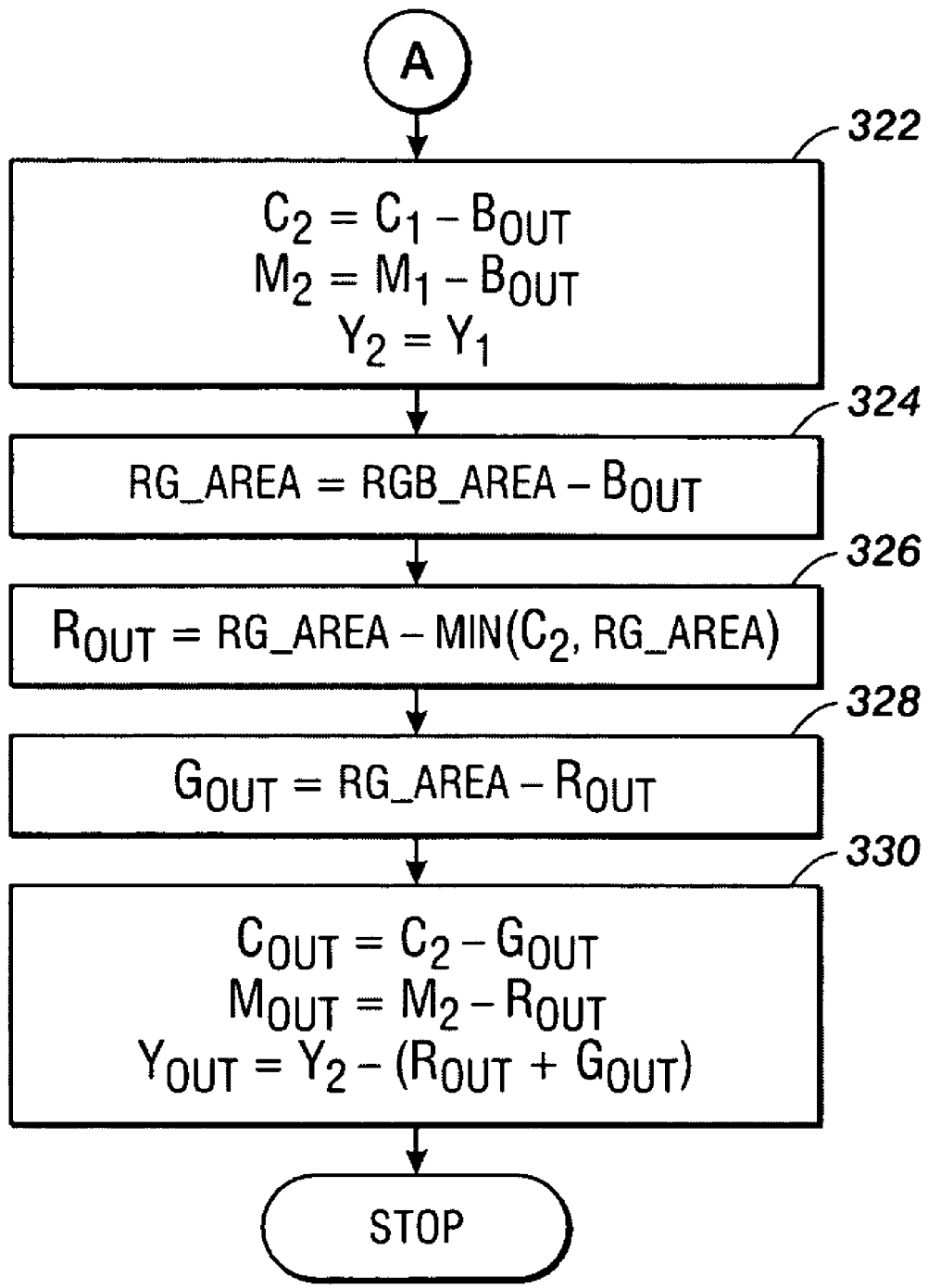
FIG. 3 is a continuation of the block diagram of FIG. 2 with flow continuing with respect to node A.

Reference is now being made to FIG. 3 which is a continuation of the flow diagram of FIG. 2.

At 322, before the amounts of secondary output ($R_{out}$ and $G_{out}$) dot coverages are determined, the amount of CMY residue ($C_2 M_2 Y_2$) needs to be updated by subtracting the amount of output blue from the above-determined CMY densities. For each of a primary CMY colors, this is given by:

$$C_2 = C_1 - B_{out};$$

$$M_2 = M_1 - B_{out};$$

$$Y_2 = Y_1.$$

Note that, since Blue=(C+M), there is no yellow component in blue. Thus no blue needs to be subtracted from yellow.

At 324, the amount of secondary RG coverage area (rg_area) remaining is determined by removing the amount of output blue dot coverage ($B_{out}$) from the above-determined minimum total secondary RGB coverage area, as given by:

$$rg\_area = rgb\_area - B_{out}.$$

At 326, the minimum amount of secondary output red coverage ($R_{out}$) required to overlap its corresponding primary color is determined by subtracting the minimum of the previously updated residue $C_2$ and the amount of secondary RG coverage area from the secondary RG coverage area, as given by:

$$R_{out} = rg\_area - \min(C_2, rg\_area).$$

At 328, the remainder is filled with output green dots. The minimum necessary secondary output green ($G_{out}$) coverage required to overlap its corresponding primary color is determined from the amount of secondary output red dot coverage and the secondary RG coverage area, as given by:

$$G_{out} = rg\_area - R_{out}.$$

Now that the minimum amounts of output RBG coverages ($R_{out}$, $B_{out}$, $G_{out}$) have been determined for the minimum total secondary RGB coverage area, the amount of each of the primary output colorants necessary to maintain input densities can be determined.

At 330, an amount of each output primary colorant coverage, $C_{out}$, $M_{out}$, $Y_{out}$, can now be calculated from their respective updated CMY residues ($C_2M_2Y_2$) and the previously determined secondary RG outputs, $R_{out}$, $G_{out}$. The coverage by each of the primary CMY outputs is given by:

$$C_{out} = G_2 - G_{out};$$

$$M_{out} = M_2 - R_{out};$$

$$Y_{out} = Y_2 - (R_{out} + G_{out}).$$

Note that yellow is a mixture of red and green and thus both have to be subtracted from the previously computed $Y_2$ density.

In such a manner by using as many less visible dots as possible (by order of brightness), each of the input $C_{in}/M_{in}/Y_{in}$ (and $K_{in}$) have been converted to an output coverage amount necessary to achieve the smoothest halftone.

It should be fully appreciated that many of the above interim calculation can be mathematically consolidated and combined into subsequent calculations and that the above-formulas have been described without any consolidations and substitutions having been performed. As claimed herein, some of the above determinations have been mathematically consolidated for claim brevity.

The above-determined minimum CMYKRGB output coverages will be used in a variety of halftoning algorithms known in the arts. One of ordinary skill would appreciate the use of the above-determined output coverages in a halftoning method. One example halftoning algorithm which can be applied is taught in U.S. Pat. No. 6,250,773 which is incorporated herein in its entirety by reference. Other halftoning algorithms can also be used. Such halftoning methods vary by device and by the objectives intended to be achieved. As such, a further discussion as to any particular halftoning method known in the arts has been omitted.

It should be understood that the flow diagrams depicted herein are illustrative. Other operations, for example, may be added, modified, enhanced, condensed, integrated, or consolidated. Variations thereof are envisioned and are intended to fall within the scope of the appended claims.

Figure 4:
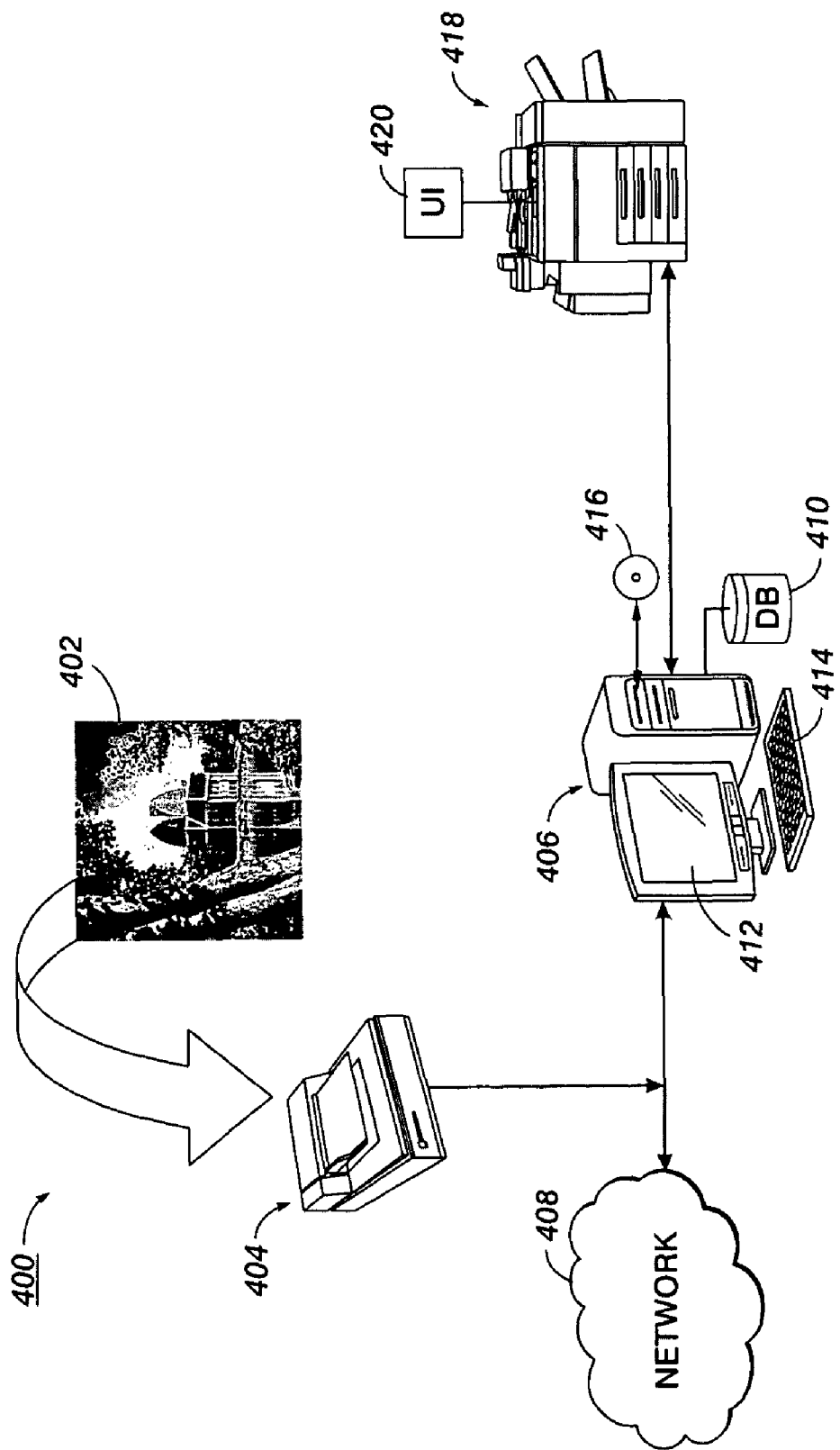
FIG. 4 which illustrates an example workflow of one embodiment of an image processing environment wherein the present method is likely to find its uses.

Reference is now being made to FIG. 4 which illustrates an example process workflow of one embodiment of an image processing environment wherein the present invention is likely to find its intended uses.

In the image processing environment 400, an original image 402 is placed on the platen of scanning device 404 wherein the image is scanned on the input CMYK channels and input color values for the pixels of the scanned image are obtained. The primary $C_{in}/M_{in}/Y_{in}$ inputs and the input $K_{in}$ are provided to computer system 406. Alternatively, the $C_{in}/M_{in}/Y_{in}$ inputs and input $K_{in}$ are obtained from network 408 or retrieved from database 410.

Computer system 406 implements database 410 wherein various data can be offloaded, stored, and retrieved. The computer system includes an interface (not shown) that forwards data over digital devices to the network 408. The computer system also includes a hard disk drive and/or a removable storage drive (internal) which reads/writes to storage media devices such as a floppy disk, magnetic tape, optical disk, CD-ROM, DVC, etc., capable of storing software, programs, database files, utility programs, and other data. Computer system 406 can be any of a desktop, laptop, server, mainframe, or the like, common in the arts. Such computers generally comprise a processor, memory, communications link, a display device 412 such as a CRT or LCD for data display, and a keyboard 414 for data entry, and a storage device for storing data on computer readable medium 416.

The received the $C_{in}/M_{in}/Y_{in}$ and $K_{in}$ are processed by the computer system 406 in accordance with the flow diagrams of FIGS. 1-3. Therein, the minimum amount of each secondary RGB color coverage required to overlap their corresponding primary colors and the minimum amount of each primary CMY color coverage necessary to maintain input densities are computed. Any of the values calculated and other additional data may be stored on the database 410. Once the determining minimum CMYKRGB output color coverages have been computed, these values are used in a halftoning algorithm to adjust color printing device 418. The halftoning algorithm can be performed by software running on either the computer system 406 or the printing device 418. The end-user can further adjust the printing device through user interface (UI) 420. It should be understood that the computer system may be placed in communication with any number of digital document reproduction systems also similarly connected to network 408.

Figure 5:
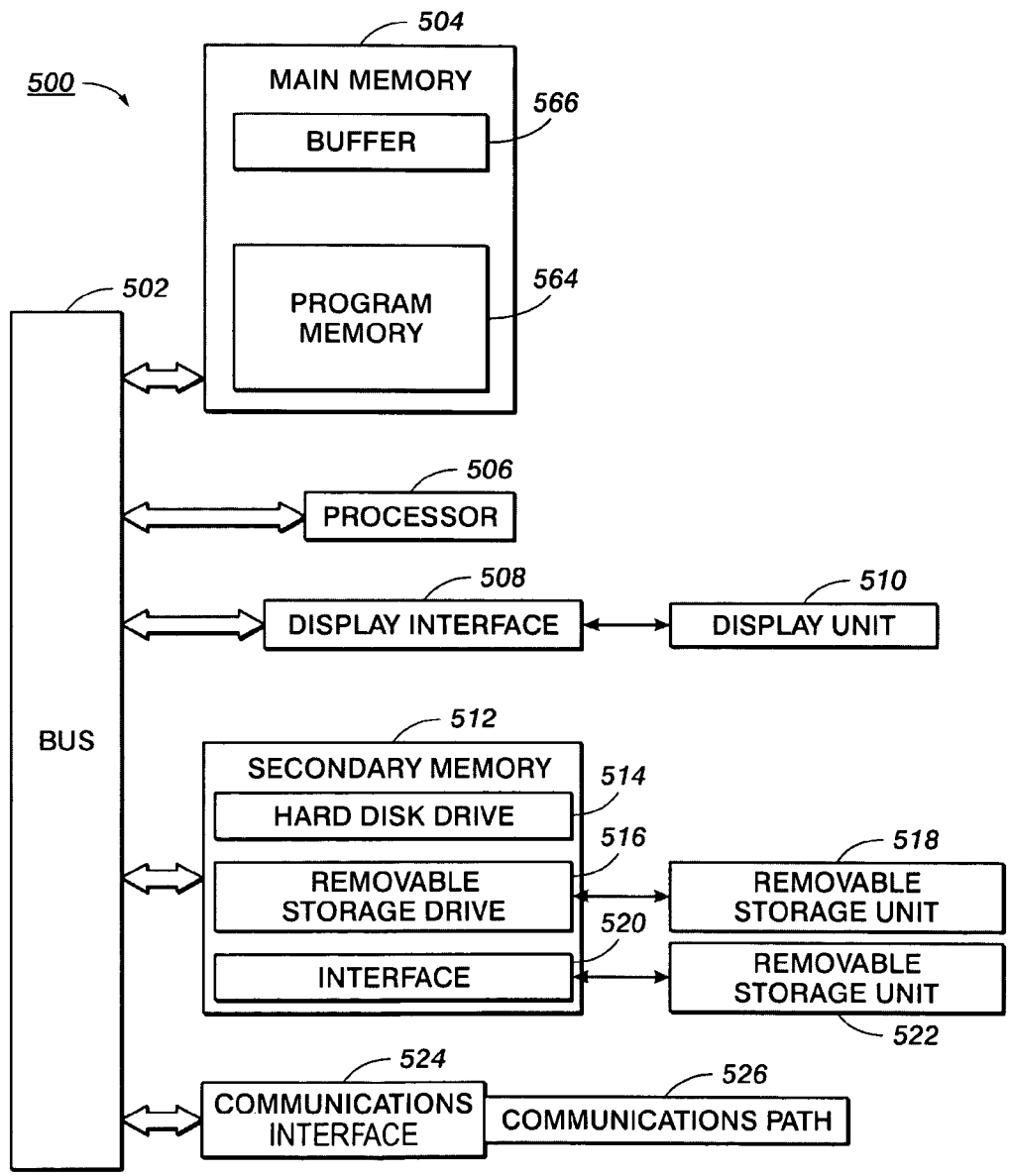
FIG. 5 illustrates a block diagram of one embodiment of a special purpose computer useful for implementing various embodiments of the present method.

Reference is now being made to FIG. 5 which illustrates a block diagram of one embodiment of a special purpose computer useful for implementing various embodiments of the present method. Such a computer system may be integrated into a workstation or color management system configured, at least in part, for executing various embodiments of the present method. Such a system or software package may also be integrated with or placed in communication with various measuring devices such as, for example, a colorimeter or spectrometer or other devices known in the art for measuring the various above-described values of an input color image.

The illustrated example computer system 500 includes processor 506 capable of executing machine executable program instructions and is in communication with bus 502. The system also includes a main memory 504 to store machine readable instructions containing some or all of the present method hereof to be executed by the processor. The main memory is capable of storing data and may include random access memory (RAM) to support reprogramming and flexible data storage. Main memory includes buffer 566 to store data and program memory 564 that includes, for example, executable programs for implementing various embodiments of the present method. The program memory is capable of storing data in buffer 566. The computer system further includes display interface 508 that forwards data from communication bus 502 to display 510.

The computer system also includes a secondary memory 512. Computer programs may also be stored in secondary memory. Such computer programs, when executed, enable the computer system to perform various embodiments, features, and enhancements to the methods provided herein. The secondary memory may include, for example, a hard disk drive 514 and/or a removable storage drive 516 which reads and writes to removable storage unit 518, such as a floppy disk, magnetic tape, optical disk, etc., that stores computer software and/or data. The secondary memory may also include other mechanisms for allowing computer program instructions to be loaded into the computer system such as, for example, a removable storage unit 522 adapted to exchange data through interface 520. Examples of such other mechanisms include a program cartridge and cartridge interface (such as those implemented in video game devices), a removable memory chip (such as an EPROM, or PROM) and associated socket, and other removable storage units and interfaces 520 which allow software and data to be transferred from the removable storage unit to the computer system.

The computer system includes a communications interface 524 which acts as both an input and an output to allow software and data to be transferred between the computer system and external devices. Examples of a communications interface include a modem, a network interface (such as an Ethernet card), a communications port, a PCMCIA slot and card, etc. Computer programs may also be received via the communications interface.

Software, data, and computer programs transferred and/or received via the communications interface may be in the form of signals such as, for example, electronic, electromagnetic, optical, or any other signals capable of being received by communications interface. These signals are provided to the communications interface via a communications path (i.e., channel) 526 which carries such signals. The communications channel path may be implemented using wire, cable, fiber optic, phone line, cellular link, RF, or other communications channels.

Figure 6:
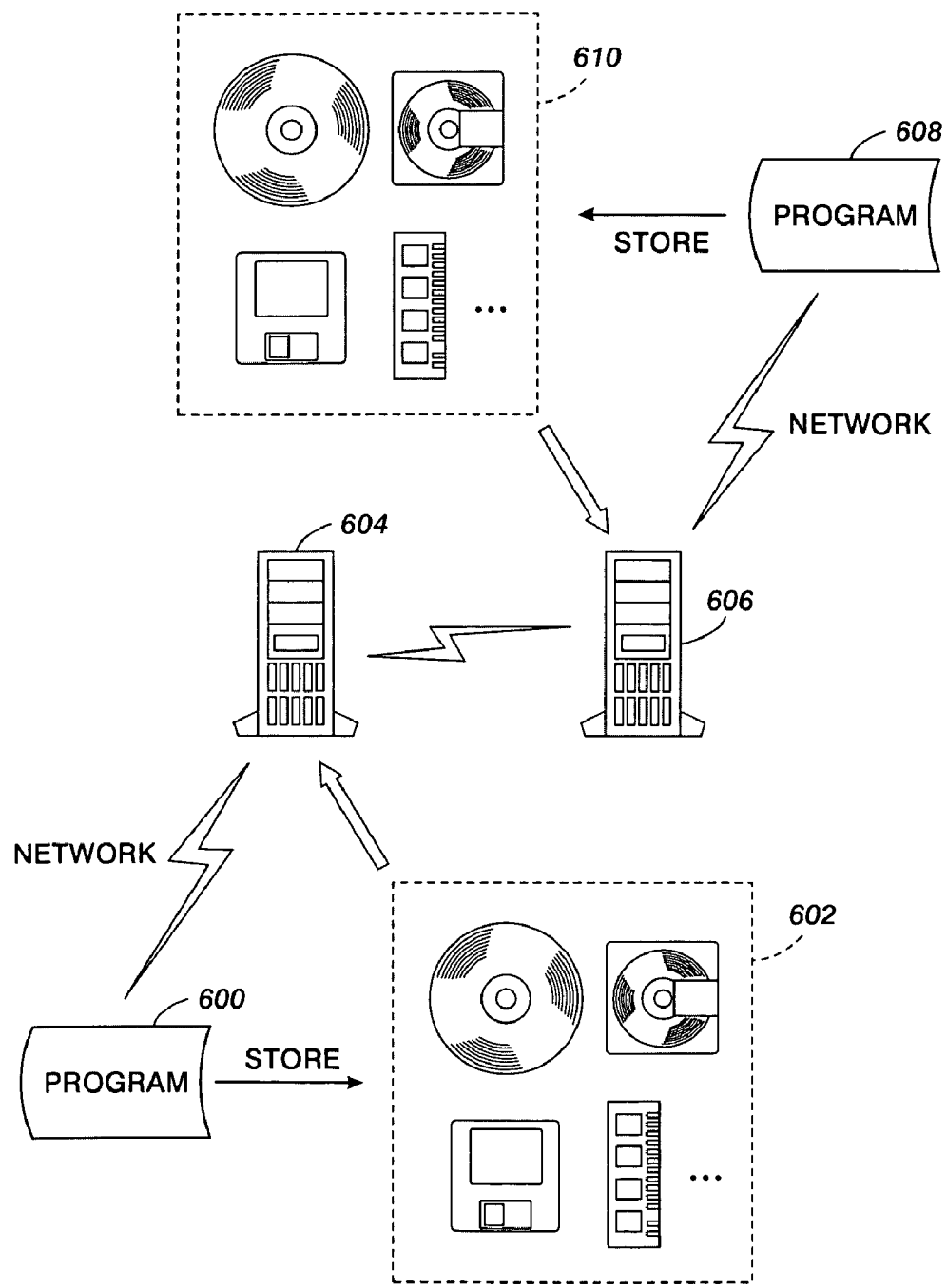
FIG. 6 is an explanatory diagram illustrating one example of a computer readable storage medium capable of storing machine readable instructions which, when mounted on a computer system, causes the system to perform one or more aspects of the present method.

Reference is now being made to FIG. 6 which is an explanatory diagram illustrating one example of a computer readable storage medium capable of storing machine readable instructions which, when mounted on a computer system, causes the system to perform one or more aspects of the present method as described above. The machine readable instructions may be modified by one computer and transferred to another computer.

In the illustrated embodiment, one or more computer program 600 for carrying out the present method are loaded on a computer-readable storage media 602 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 604 and transferred or otherwise communicated to computer system 606. The program instructions can then be off-loaded to another program 608, in original form or modified, including data, and stored on storage media 610. Both of the computer systems include processors capable of executing machine readable program instructions.

The term computer program product is intended to include any computer readable medium, computer executable medium, computer usable medium, or machine readable media capable of providing instructions and/or data to a computer system for implementing one or more aspects of the present method as described above. The computer program product is capable of storing data, instructions, messages packets, or other machine readable information, and includes non-volatile memory, such as a floppy disk, hard drive and volatile memory such as ROM, RAM, flash, and the like. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer program product may additionally contain information held in a transitory state such as a network link or a network interface which may include a wired network or a wireless network which allows a computer to read such computer readable information.

It should be understood that the flow diagram hereof are intended to be illustrative. Other operations, for example, may be added, modified, enhanced, condensed, integrated, or consolidated. Variations thereof are intended to fall within the scope of the appended claims.

It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in. Such an article of manufacture may further be shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for minimizing dot visibility in a color marking device capable of dot-on-dot printing, the method comprising:

receiving, from a scanning device, input $C_{in}/M_{in}/Y_{in}$ channels and an input $K_{in}$ of a color image;

summing said received $C_{in}/M_{in}/Y_{in}$ inputs to obtain a total remaining CMY ink coverage, $sum_0$;

determining an amount of overlapping CMY;

adding said input $K_{in}$ to said amount of overlapping CMY to obtain $K_{out}$;

subtracting said amount of overlapping CMY from each $C_{in}/M_{in}/Y_{in}$ to obtain a density, $C_1, M_1, Y_1$;

summing said densities to obtain a total CMY density, $sum_1$;

determining a minimum total secondary RGB coverage;

determining a minimum amount of each secondary RGB color coverage comprising $rgb\_area = max(sum_1 - 100 + K_{out}, 0)$;

determining a minimum amount of each primary CMY color coverage;

halftoning a color marking device using said determined minimum color coverages; and rendering said color image using said color marking device.

2. The method of claim 1, further comprising, in response to any of said received inputs being greater than a predetermined threshold, clipping each $C_{in}/M_{in}/Y_{in}$ such that no primary CMY colorant overlaps with colorant $K_{in}$.

3. The method of claim 1, wherein determining said overlapping CMY comprises: K'=max(sum$_0$−200+2*K$_{in}$, 0).

4. The method of claim 1, wherein said minimum output secondary RGB color coverage comprises:

$B_{out}$=rgb_area−min($Y_1$,rgb_area);

$R_{out}$=rgb_area−($B_{out}$+min($C_1$−$B_{out}$,rgb_area−$B_{out}$)); and $G_{out}$=rgb_area−($B_{out}$+$R_{out}$).

5. The method of claim 4, wherein determining said minimum output primary CMY color coverage comprises:

$C_{out}$=$C_1$−($B_{out}$+$G_{out}$);

$M_{out}$=$M_1$−($B_{out}$+$R_{out}$); and $Y_{out}$=$Y_1$−($R_{out}$+$G_{out}$).

6. A system for minimizing dot visibility in a color marking device capable of dot-on-dot printing, the system comprising:
 a storage medium capable of storing data; and
 a processor in communication with said storage medium, said processor capable of executing a machine readable instruction for performing the method of:
  receiving, from a scanning device, input $C_{in}/M_{in}/Y_{in}$ channels and an input $K_{in}$ of a color image;
  summing said received $C_{in}/M_{in}/Y_{in}$ inputs to obtain a total remaining CMY ink coverage, sum$_0$;
  determining an amount of overlapping CMY;
  adding said input $K_{in}$ to said amount of overlapping CMY to obtain $K_{out}$;
  subtracting said amount of overlapping CMY from each $C_{in}/M_{in}/Y_{in}$ to obtain a density, $C_1$, $M_1$, $Y_1$;
  summing said densities to obtain a total CMY density, sum$_1$;
  determining a minimum total secondary RGB coverage comprising rgb_area=max(sum$_1$−100+$K_{out}$, 0);
  determining a minimum amount of each secondary RGB color coverage;
  determining a minimum amount of each primary CMY color coverage;
  halftoning a color marking device using said determined minimum color coverages; and
  rendering said color image using said color marking device.

7. The system of claim 6, further comprising, in response to any of said received $C_{in}/M_{in}/Y_{in}$ inputs being greater than a predetermined threshold, clipping each $C_{in}/M_{in}/Y_{in}$ such that no primary CMY colorant overlaps with colorant $K_{in}$.

8. The system of claim 6, wherein determining said overlapping CMY comprises: K'=max(sum$_0$−200+2*K$_{in}$, 0).

9. The system of claim 6, wherein determining said minimum output secondary RGB color coverage comprises:

$B_{out}$=rgb_area−min($Y_1$,rgb_area);

$R_{out}$=rgb_area−($B_{out}$+min($C_1$−$B_{out}$,rgb_area−$B_{out}$)); and $G_{out}$=rgb_area−($B_{out}$+$R_{out}$).

10. The system of claim 9, wherein determining said minimum output primary CMY color coverage comprises:

$C_{out}$=$C_1$−($B_{out}$+$G_{out}$);

$M_{out}$=$M_1$−($B_{out}$+$R_{out}$); and $Y_{out}$=$Y_1$−($R_{out}$+$G_{out}$).

11. A non-transitory computer program product for minimizing dot visibility in a color marking device capable of dot-on-dot printing, the computer program product comprising:
 a non-transitory computer readable medium storing instructions that, when executed on a computer, cause the computer to perform a method comprising:
  receiving, from a scanning device, input $C_{in}/M_{in}/Y_{in}$ channels and an input $K_{in}$ of a color image;
  summing said received $C_{in}/M_{in}/Y_{in}$ inputs to obtain a total remaining CMY ink coverage, sum$_0$;
  determining an amount of overlapping CMY;
  adding said input Kin to said amount of overlapping CMY to obtain $K_{out}$; subtracting said amount of overlapping CMY from each $C_{in}/M_{in}/Y_{in}$ to obtain a density, $C_1$, $M_1$, $Y_1$;
  summing said densities to obtain a total CMY density, sum$_s$;
  determining a minimum total secondary RGB coverage comprising rgb_area=max(sum$_1$−100+$K_{out}$,0);

determining a minimum amount of each secondary RGB color coverage;
  determining a minimum amount of each primary CMY color coverage;
  halftoning a color marking device using said determined minimum color coverages; and
  rendering said color image using said color marking device.

12. The non-transitory computer program product of claim 11, wherein determining said overlapping CMY comprises: K'=max(sum$_0$−200+2*K$_{in}$, 0).

13. The non-transitory computer program product of claim 11, wherein determining said minimum output secondary RGB color coverage comprises:

$B_{out}$=rgb_area−$m$in($Y1$,rgb_area);

$R_{out}$=rgb_area−($B_{out}$+min($C_1$−$B_{out}$,rgb_area−$B_{out}$)); and $G_{out}$=rgb_area−($B_{out}$+$R_{out}$).

14. The non-transitory computer program product of claim 13, wherein determining said minimum output primary CMY color coverage comprises:

$C_{out}$=$C_1$−($B_{out}$+$G$out);

$M_{out}$=$M_1$−($B_{out}$+$R_{out}$); and $Y_{out}$=$Y_1$−($R_{out}$+$G_{out}$).

15. The non-transitory computer program product of claim 11, further comprising, in response to any of said received $C_{in}/M_{in}/Y_{in}$ inputs being greater than a predetermined threshold, clipping each $C_{in}/M_{in}/Y_{in}$ such that no primary CMY colorant overlaps with colorant $K_{in}$.

* * * * *